US00RE37529E

(19) United States
(12) Reissued Patent
Bednar et al.

(10) Patent Number: US RE37,529 E
(45) **Date of Reissued Patent: *Jan. 29, 2002**

(54) CLUTCH MECHANISM FOR RECIPROCATING SAWS

(75) Inventors: Thomas R. Bednar, Pewaukee, WI (US); Scott L. Kidney, Sunnyvale, CA (US)

(73) Assignee: Milwaukee Tool Corporation, Brookfield, WI (US)

( * ) Notice: This patent is subject to a terminal disclaimer.

(21) Appl. No.: 09/500,252

(22) Filed: Feb. 8, 2000

Related U.S. Patent Documents

Reissue of:
(64) Patent No.: 5,689,891
Issued: Nov. 25, 1997
Appl. No.: 08/658,889
Filed: May 30, 1996

U.S. Applications:

(63) Continuation of application No. 09/164,985, filed on Oct. 1, 1998, now Pat. No. Re. 37,211, which is a continuation-in-part of application No. 08/444,069, filed on May 18, 1995, now Pat. No. 5,566,458, and application No. 08/443,784, filed on May 18, 1995, now Pat. No. 5,607,023, which is a continuation-in-part of application No. 08/354,518, filed on Dec. 13, 1994, now abandoned, and application No. 08/354,560, filed on Dec. 13, 1994, now abandoned, said application No. 08/444,069, is a continuation-in-part of application No.08/354,518, and application No. 08/354,560.

(51) Int. Cl.[7] ..... B23D 49/10; F16D 7/02
(52) U.S. Cl. ..... 30/394; 30/392; 464/36; 464/46
(58) Field of Search ..... 30/392, 393, 394; 464/35, 36, 46; 173/176, 178; 192/56.55, 56.57, 56.6, 56.62

(56) References Cited

U.S. PATENT DOCUMENTS

| | | | | |
|---|---|---|---|---|
| 1,744,976 A | | 1/1930 | Levedahl | |
| 2,566,183 A | | 8/1951 | Forss | |
| 2,639,737 A | | 5/1953 | Forsberg | |
| 2,790,471 A | | 4/1957 | Graybill | |
| 3,170,496 A | | 2/1965 | Kohler et al. | |
| 3,454,059 A | | 7/1969 | Sindelar | |
| 3,461,732 A | * | 8/1969 | Gregory | 74/60 |
| 3,527,273 A | | 9/1970 | Falter | |
| 3,605,443 A | | 9/1971 | Redelman | |
| 3,657,813 A | | 4/1972 | Knight | |
| 3,681,940 A | | 8/1972 | Albrile | |
| 3,934,629 A | | 1/1976 | Boman | |
| 3,937,036 A | | 2/1976 | Sauerwein | |
| 3,943,800 A | | 3/1976 | Lesner | |

(List continued on next page.)

FOREIGN PATENT DOCUMENTS

| | | |
|---|---|---|
| DE | G9301295 | 12/1993 |
| GB | 635227 | 4/1950 |
| GB | 2 042 973 | 10/1980 |
| GB | 1 596 408 | 8/1981 |
| GB | 2 181 693 | 4/1987 |

*Primary Examiner*—Boyer Ashley
(74) *Attorney, Agent, or Firm*—Michael Best & Friedrich LLP

(57) ABSTRACT

A reciprocating saw including a housing, a spindle mounted for reciprocating motion within the housing, a gear rotatably mounted within the housing, a wobble shaft rotatably mounted within the housing, a wobble plate rotatably mounted on the wobble shaft and connected to the spindle, and a clutch drivingly connecting the gear to the wobble shaft. The clutch includes a clutch driver rotatably positioned within the housing adjacent the wobble shaft, and the clutch driver includes a recess for insertably receiving a portion of the wobble shaft. The clutch driver can also include a relief ledge for providing clearance between the clutch driver and the wobble plate. The clutch can further include a first clutch disk connected with the gear and positioned between the gear and the clutch driver, and a second clutch disk connected with the clutch driver and positioned between the gear and the first clutch disk.

3 Claims, 6 Drawing Sheets

U.S. PATENT DOCUMENTS 3,945,120 A 3/1976 Ritz
3,971,132 A 7/1976 Griffes et al.
4,006,785 A 2/1977 Roll et al.
4,114,270 A 9/1978 Jansen-Herfeld et al.
4,133,187 A 1/1979 Wildhaber
4,220,230 A 9/1980 Hansen
4,265,320 A 5/1981 Tanaka et al.
4,365,962 A 12/1982 Regelsberger
4,418,766 A 12/1983 Grossmann
4,436,163 A 3/1984 Simpson
4,448,098 A 5/1984 Totsu
4,448,261 A 5/1984 Kousek et al.
4,542,812 A 9/1985 Westley
4,630,512 A 12/1986 Dürr
4,655,103 A 4/1987 Schreiber et al.
4,676,001 A 6/1987 Wagner
4,687,082 A 8/1987 Lenfeldt
4,699,036 A 10/1987 Henne
4,721,169 A 1/1988 Nagasawa et al.
4,776,406 A 10/1988 Wanner
4,776,442 A * 10/1988 Young ..... 464/46 X
4,809,572 A 3/1989 Sasaki
4,901,610 A 2/1990 Larson et al.
4,921,083 A * 5/1990 Etscheidt et al. ..... 464/46 X
4,967,888 A 11/1990 Lippacher et al.
4,976,164 A 12/1990 Lentino
5,005,684 A 4/1991 Fujii
5,025,562 A 6/1991 Palm
5,050,307 A 9/1991 Palm
5,060,733 A 10/1991 Kress
5,079,844 A 1/1992 Palm
5,092,441 A 3/1992 Fujii
5,113,951 A 5/1992 Houben et al.
5,129,465 A 7/1992 Rahm
5,138,916 A 8/1992 Sato et al.
5,392,519 A * 2/1995 Inoue et al. ..... 30/393
5,555,626 A * 9/1996 Fuchs ..... 30/393
5,566,458 A * 10/1996 Bednar ..... 30/392
5,607,023 A * 3/1997 Palm ..... 173/178
5,689,891 A * 11/1997 Bednar et al. ..... 30/394
5,782,000 A * 7/1998 Bednar ..... 30/393
6,021,573 A * 2/2000 Kikuchi et al. ..... 30/392

* cited by examiner

CLUTCH MECHANISM FOR RECIPROCATING SAWS

Matter enclosed in heavy brackets [ ] appears in the original patent but forms no part of this reissue specification; matter printed in italics indicates the additions made by reissue.

REFERENCE TO RELATED APPLICATIONS

This [application] *reissue application 09/500,252, is a continuation of co-pending Reissue application Ser. No. 09/164,985, filed Oct. 1, 1998 both of which are reissues of U.S. Pat. Nos. 5,689,891 (filed May 30, 1996 as Ser. No. 08/658,889) which* is a continuation-in-part of U.S. patent applications Ser. No. 08/444,069, now U.S. Pat. No. 5,566, 458, and Ser. No. 08/443,784, now U.S. Pat. No. 5,607,023, both filed May 18, 1995, and both of which are continuation-in-part applications of U.S. patent applications Ser. No. 08/354,518, abandoned, and Ser. No. 08/354,560, abandoned, both filed Dec. 13, 1994.

FIELD OF THE INVENTION

The present invention generally relates to the field of reciprocating saws.

BACKGROUND OF THE INVENTION

Reciprocating drive mechanisms are known in the art. See, for example, U.S. Pat. No. 5,050,307, issued to Palm on Sep. 24, 1991, U.S. Pat. No. 5,025,562, issued to Palm on Jun. 25, 1991, and U.S. Pat. No. 5,079,844, issued to Palm on Jan. 14, 1992, each of which is assigned to the assignee of the present invention, and is incorporated herein by reference.

Reciprocating drive mechanisms are found, for example, in reciprocating saws. Such reciprocating saws typically include a housing including a gear case, a motor in the housing having a motor shaft, a jackshaft mounted in the housing parallel to the motor shaft, and a gear and pinion connecting the motor shaft to the jackshaft. A primary wobble plate, including a drive arm, is mounted on the Jackshaft, and a tubular spindle is mounted in the gear case for reciprocating motion. The spindle has a longitudinal slot, and the drive arm projects through the slot where it is connected to the portion of the spindle opposite the slot on the other side of the axis of the spindle. The drive arm reciprocates the spindle as the jackshaft is rotated. A secondary wobble plate is mounted on the Jackshaft, and includes a drive arm for reciprocating a counterbalance that is coaxial with the spindle, to reduce vibration.

Some hand held electric tools, such as electric screwdrivers, include clutch mechanisms that activate at a torque less than the stalling torque of the motor in the tool. For example, when a screw driven by an electric screwdriver has been driven all the way into a wall, the clutch will activate to prevent stripping of the threads. Because the clutch activates at a torque less than the stalling torque of the motor, the motor in the tool continues to rotate after the clutch has activated.

Attention is directed to U.S. patent application Ser. No. 08/275,151, filed Jul. 14, 1994, now U.S. Pat. No. 5,588, 496, which is assigned to the assignee of the present invention, and which is incorporated herein by reference.

SUMMARY OF THE INVENTION

The inventor of the present invention has recognized that in a reciprocating saw, the saw bit occasionally locks or binds, for example if a blade encounters a knot in wood being sawed, or is otherwise overloaded. Also, the spindle of a saw occasionally hits a work piece. Either situation creates a high energy impulse of short duration on the drive mechanism of the saw. Such an impulse can cause failure to occur in the saw. For example, wobble plates may bend, or bearings may be damaged. Such an impulse can cause failure to occur at the gear and pinion. This is the most serious type of failure, as these parts are expensive to replace.

The invention provides a reciprocating saw comprising a housing, a spindle mounted for reciprocating motion within the housing, a gear rotatably mounted within the housing, a wobble shaft rotatably mounted within the housing, a wobble plate rotatably mounted on the wobble shaft and connected to the spindle, and a clutch drivingly connecting the gear to the wobble shaft. In accordance with one aspect of the present invention, the clutch includes a clutch driver rotatably positioned within the housing adjacent the wobble shaft, and the clutch driver includes a recess for insertably receiving a portion of the wobble shaft. By virtue of the recess, the transfer of power from the clutch driver to the wobble shaft occurs through a larger surface area, thereby reducing the likelihood of failure.

Preferably, the saw further comprises a shaft rotatably mounted within the housing, and the clutch driver and the wobble shaft are positioned about the shaft. For example, the clutch driver can include an orifice for receiving the shaft, and the recess can extend substantially completely around the orifice. The clutch driver and the wobble shaft are mounted for rotation about a rotational axis, and the recess is preferably asymmetrical with respect to the rotational axis. In another embodiment, the recess includes an inner contour, the wobble shaft includes an end facing the clutch driver and having an outer contour, and the outer contour of the end substantially matches the inner contour of the recess.

In accordance with another aspect of the present invention, the clutch includes a clutch driver rotatably positioned within the housing adjacent the wobble shaft, a first clutch disk connected with the gear and positioned between the gear and the clutch driver, and a second clutch disk connected with the clutch driver and positioned between the gear and the first clutch disk. Preferably, the clutch driver includes a hub portion, and the first and second clutch disks are mounted about the hub portion. The gear can also be mounted about the hub portion.

In one embodiment, the gear includes a plurality of grooves, and the first disk includes a plurality of splines positioned within the grooves. The clutch driver can also include a plurality of grooves, and the second clutch disk can include a plurality of splines positioned within the grooves. Preferably, the gear includes a recess, and the first and second clutch disks are positioned within the recess.

In accordance with another aspect of the present invention, the clutch includes a clutch driver rotatably positioned within the housing adjacent the wobble shaft, the clutch driver including a relief ledge for providing clearance between the clutch driver and the wobble plate.

Other features and advantages of the invention will become apparent to those of ordinary skill in the art upon review of the following detailed description, claims, and drawings.

DETAILED DESCRIPTION

Figure 1:
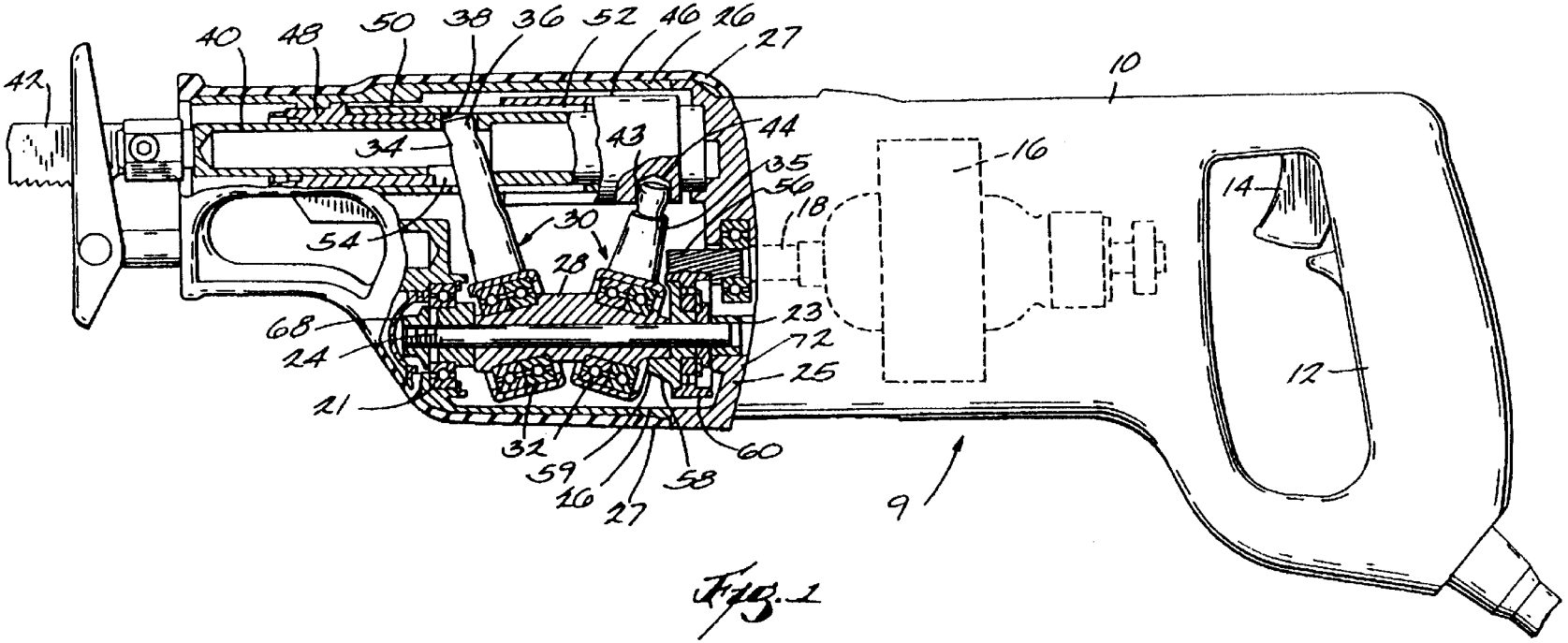
FIG. 1 is side elevation view, partly in section, of a reciprocating saw embodying various features of the invention.

FIGS. 1–4 illustrate a reciprocating saw 9 embodying some of the features of the present invention. The saw 9 includes a main body 10 which includes a handle portion 12. The saw 9 includes a motor 16 supported by the main body 10, and an on-off trigger switch 14 supported by the handle portion 12 and electrically connected to the motor 16 for controlling energization of the motor 16. The motor 16 includes a motor shaft 18.

The saw 9 further includes a gear case 26 and a diaphragm 25 in the main body 10, and a jackshaft 24 journaled in the gear case 26 and the diaphragm 25 by roller bearings 21 and needle bearings 23, respectively. The jackshaft 24 is positioned parallel to the motor shaft 18. The saw 9 further includes a urethane or rubber insulating "boot" 27 covering the gear case 26.

The saw 9 further includes means for converting rotary motion into reciprocating motion. In the illustrated embodiment, such means comprises a wobble plate drive member in the form of a wobble shaft 28 rotatably mounted on the jackshaft 24, and two wobble plate assemblies 30 mounted on the wobble shaft 28. Other means can be employed for converting rotary motion into reciprocating motion. For example, the counterbalanced reciprocating mechanism described in U.S. Pat. No. 5,079,844, issued to Palm, can be employed.

The wobble plate assemblies 30 convert rotary motion into reciprocating motion. Each wobble plate assembly 30 has an input bearing 32 mounted on the wobble shaft 28. The wobble plate assembly 30 on the left (in the figures) is a primary assembly, and the wobble plate assembly 30 on the right (in the figures) is a secondary assembly. Each wobble plate assembly 30 has a drive arm. The primary wobble plate assembly has a drive arm 34 having a somewhat spherical tip 36. The secondary wobble plate assembly has a drive arm 35 also having a somewhat spherical tip 43.

The saw 9 further includes a reciprocating tubular spindle 40 mounted in the gear case 26 for reciprocating motion and parallel to the jackshaft 24. The spindle 40 includes a socket or hole 38 receiving the spherical tip 36 of the primary wobble plate assembly 30, and the spindle 40 is reciprocated by the primary wobble plate assembly 30. The spindle 40 further includes a slot 54 in the lower portion of the spindle 40, opposite the hole 38, for receiving the drive arm 34 of the primary wobble plate assembly 30. The spindle 40 selectively carries a saw blade 42 or other tool bits, outside of the main body 10. The saw blade 42 is attached to or removed from the spindle 40 using a screw or other suitable attachment mechanism.

The saw 9 further includes a reciprocating counterweight 46, mounted in the gear case 26 coaxial with the spindle 40 for reciprocation opposite to the reciprocation of the spindle 40 so as to reduce vibration. The counterweight 46 has a hole 44 receiving the spherical tip 43 of the secondary wobble plate assembly 30 and the counterweight 46 is reciprocated by the secondary wobble plate assembly 30.

The saw 9 includes a spindle bearing 48 fixed in the gear case 26. The reciprocating spindle 40 slides inside of and is guided by the spindle bearing 48. The saw 9 further includes a sleeve 50 fixed on the outside of the bearing 48. The counterweight 46 slides on the outside of the sleeve 50. The sleeve 50 has opposed slots 52, and the drive arm 34 of the primary wobble plate assembly 30 projects through the bottom slot 52 in the sleeve 50, through the slot 54 in the spindle 40, so that the tip 36 can engage the socket or hole 38 in the top of the spindle 40. The sides of the slot 54 engage a cylindrical exterior portion of the drive arm 34, and this engagement prevents the spindle 40 from rotating about the spindle axis of reciprocation.

The saw 9 further includes means drivingly connecting the motor shaft 18 to the jackshaft 24 and providing slippage between the motor shaft 18 and the Jackshaft 24 if there is binding of the spindle 40, such as if the blade 42 encounters a knot or a nail in a workpiece, or the spindle 40 hits the workpiece.

Figure 2:
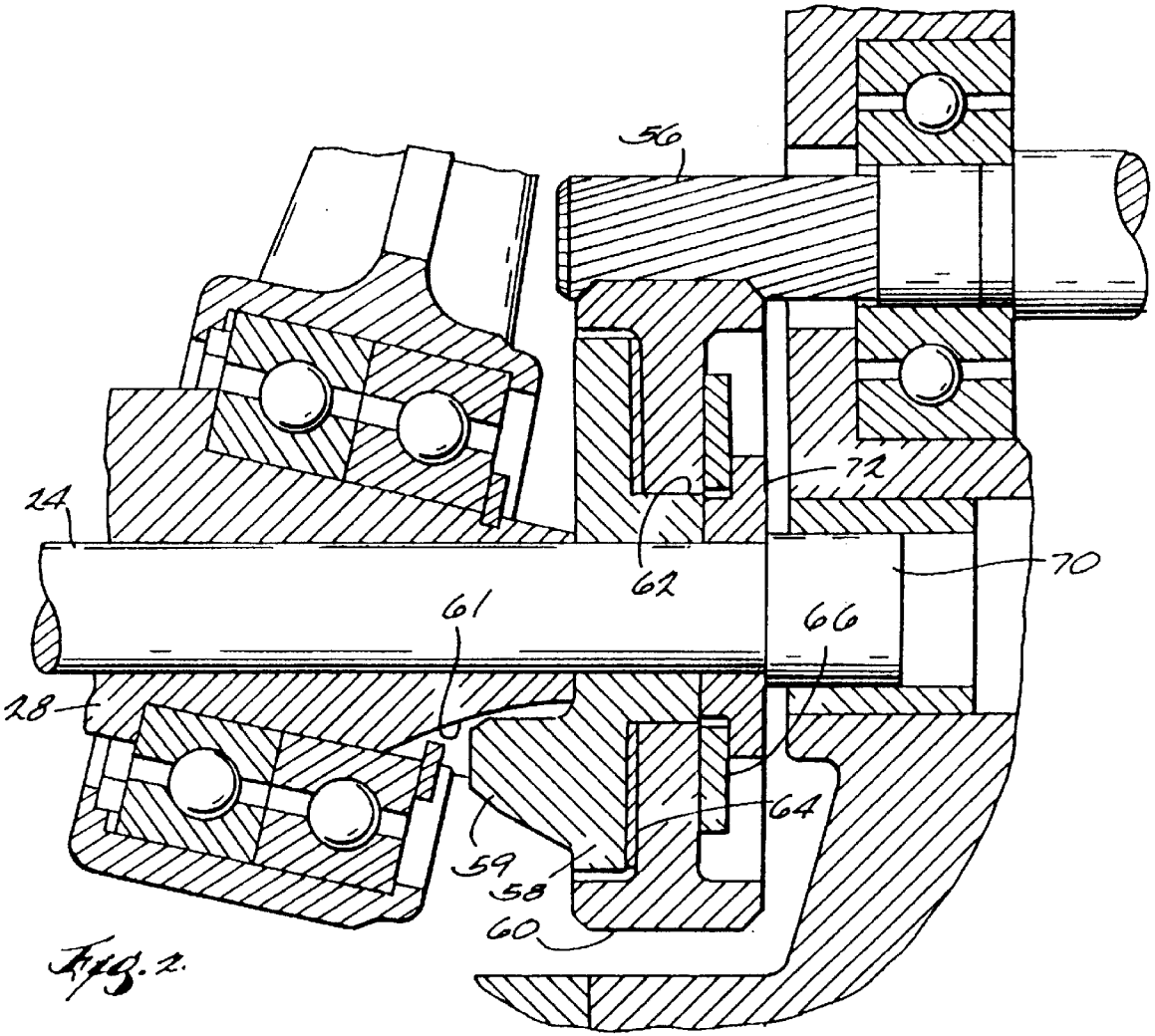
FIG. 2 is an enlarged view of a clutch mechanism included in the saw of FIG. 1.

In one embodiment of the invention, shown in FIGS. 1–2, the motor shaft 18 includes a driving pinion 56 oriented to rotate about an axis parallel to the jackshaft 24, and the means providing slippage comprises a clutch mechanism including a clutch driver 58 mounted on the jackshaft 24 and drivingly engaging the wobble shaft 28. More particularly, the clutch driver 58 includes a tab or projection 59 which fits in and engages a keyway 61 in the wobble shaft 28.

The clutch mechanism further includes a driven gear 60 rotatably mounted on the Jackshaft 24, adjacent the clutch driver 58. More particularly, in the embodiment shown in FIGS. 1–2, the driven gear 60 is rotatably mounted on a hub portion 62 of the clutch driver 58. The clutch driver 58 has a discoidal surface perpendicular to the Jackshaft 24. The driven gear 60 has a circumference that is greater than the circumference of the clutch driver 58, and includes a discoidal surface perpendicular to the jackshaft 24 which faces the discoidal surface of the clutch driver 58. The clutch mechanism may include a clutch disk 64 located axially between the clutch driver 58 and the driven gear 60, mounted on the hub portion 62, and having a first side frictionally engaging the discoidal surface of the clutch driver 58 and having an opposite side frictionally engaging the discoidal surface of the driven gear 60.

The driving pinion 56 drivingly engages the driven gear 60. The clutch mechanism further comprises a spring 66 biasing the driven gear 60 into engagement with the clutch driver and providing slippage if there is binding of the spindle 40. In the illustrated embodiment, the spring 66 is a disk spring. The jackshaft 24 further includes an end having an enlarged diameter portion 70, and the saw 9 further includes a spring retainer 72 mounted on the jackshaft 24, against the enlarged diameter portion 70, and retaining the disk spring 66 against the driven gear 60.

The disk spring 66 controls frictional engagement of the clutch disk 64 with the driven gear 60 and clutch driver 58. If a clutch disk 64 is not used, the disk spring 66 controls frictional engagement between the driven gear 60 and the clutch driver 58. The disk spring 66 is compressed to a predetermined load setting during manufacture of the saw 9 by tightening an axle nut 68 to squeeze all the pieces mounted on the jackshaft 24, including the disk spring 66. The clutch mechanism will slip when the load on the saw spindle 40 or blade 42 exceeds the force applied by the disk spring 66. More particularly, the clutch disk 64 will slip relative to either or both of the driven gear 60 and the clutch driver 58. This prevents damage to the wobble plate assemblies 30 and the driving pinion 56 when the blade locks or binds, hits something like a knot or nail, or is otherwise overloaded.

Figure 3:
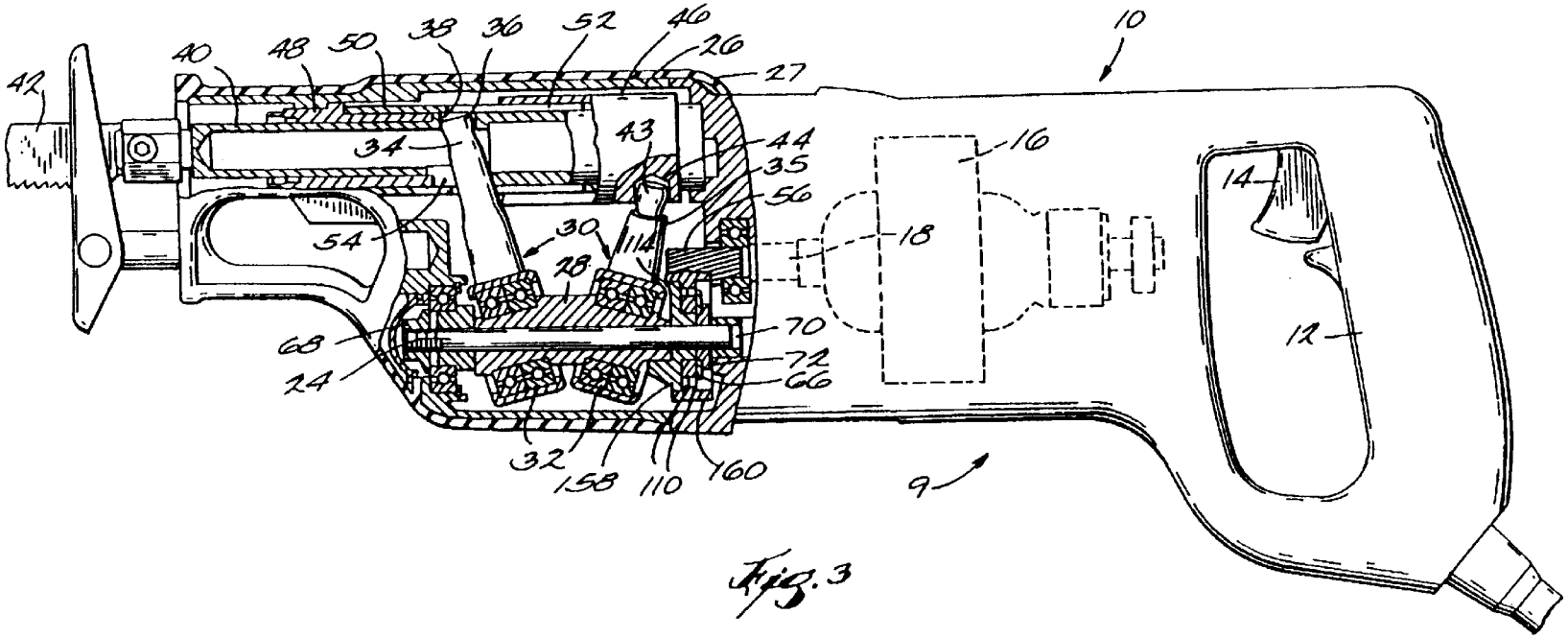
FIG. 3 is a side elevation view, partly in section, showing an alternative embodiment of the invention.
Figure 4:
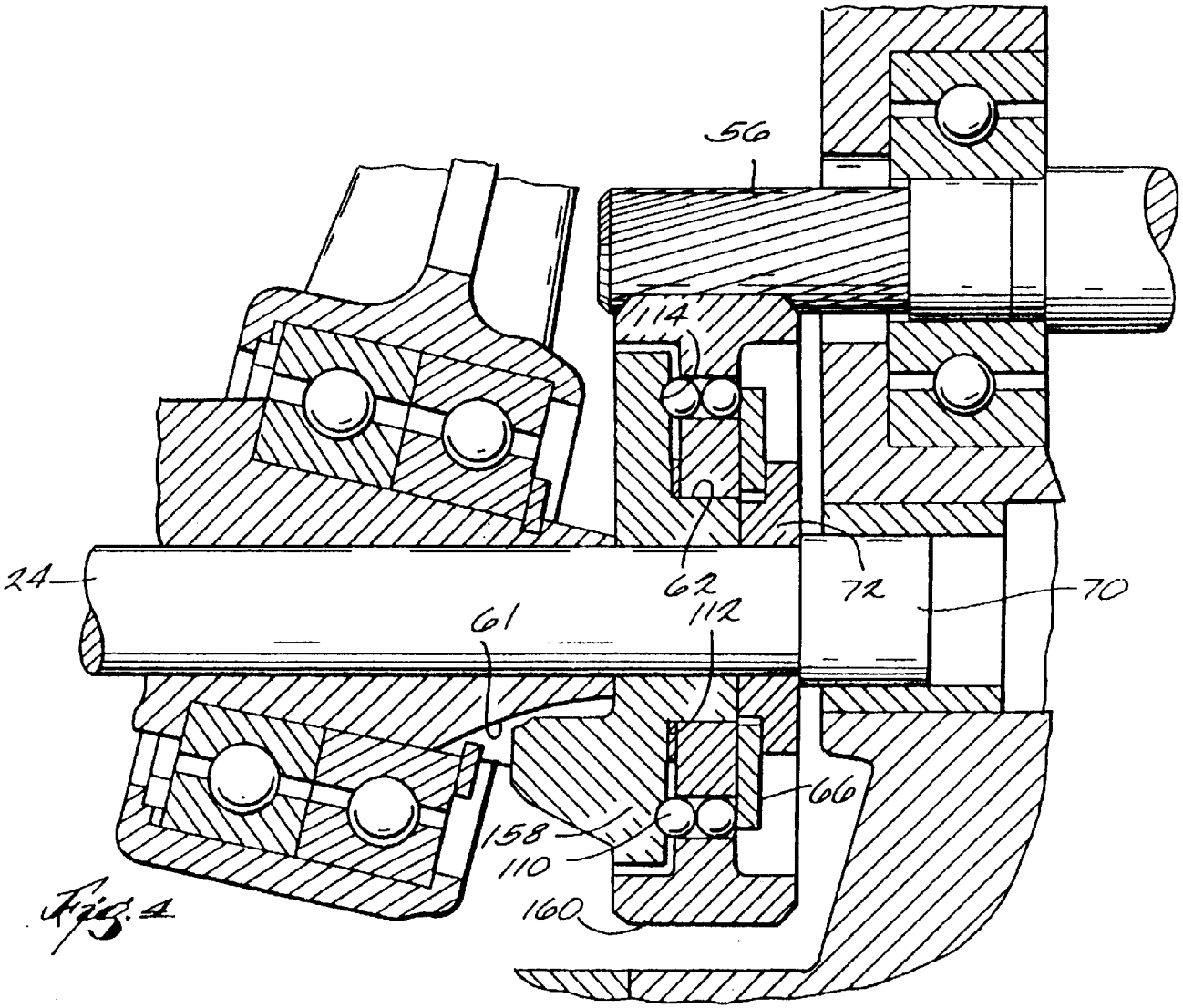
FIG. 4 is an enlarged view of a clutch mechanism included in the saw of FIG. 3.

A second embodiment of the present invention is illustrated in FIGS. 3–4. The embodiment shown in FIGS. 3–4 is substantially similar to the embodiment shown in FIGS. 1–2 which was just described. In this regard, like reference numerals indicate like components, except that in this embodiment, the driven gear 160 includes circumferentially spaced apertures which house ball bearings 110, and the clutch driver 158 includes a pocket or depression 114 in its side facing the driven gear 160. The ball bearings 110 are housed between, and engage, the pocket or depression 114 on one side of the driven gear 160 and the disk spring 66 on the other side of the driven gear 160. Also, in this embodiment, the clutch disk 64 is removed. A spacer 112 is provided between the clutch driver 158 and the driven gear 160 radially interior of the ball bearings 110.

By pressing against the driven gear 160 and ball bearings 110, the disk spring 66 controls engagement of the ball bearings 110 with the pocket or depression 114 in the clutch driver 158. The clutch mechanism will slip when the load on the spindle 40 or blade 42 exceeds the force applied by the disk spring 72. This prevents damage to the wobble plate assemblies 30 and the driving pinion 56 when the blade locks or binds, hits something like a knot or nail, or is otherwise overloaded.

Figure 5:
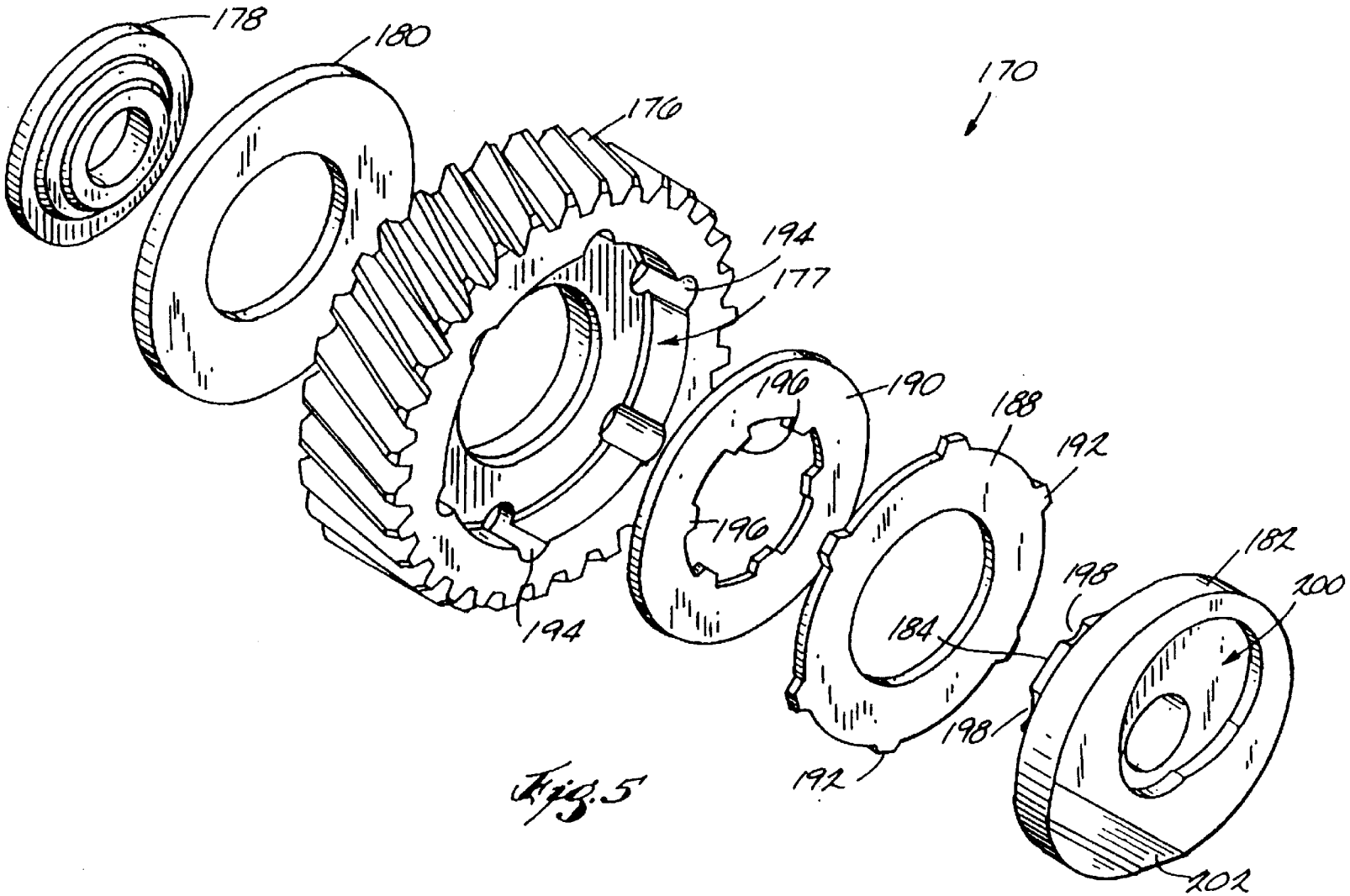
FIG. 5 is a perspective assembly view of an alternative clutch mechanism.
Figure 6:
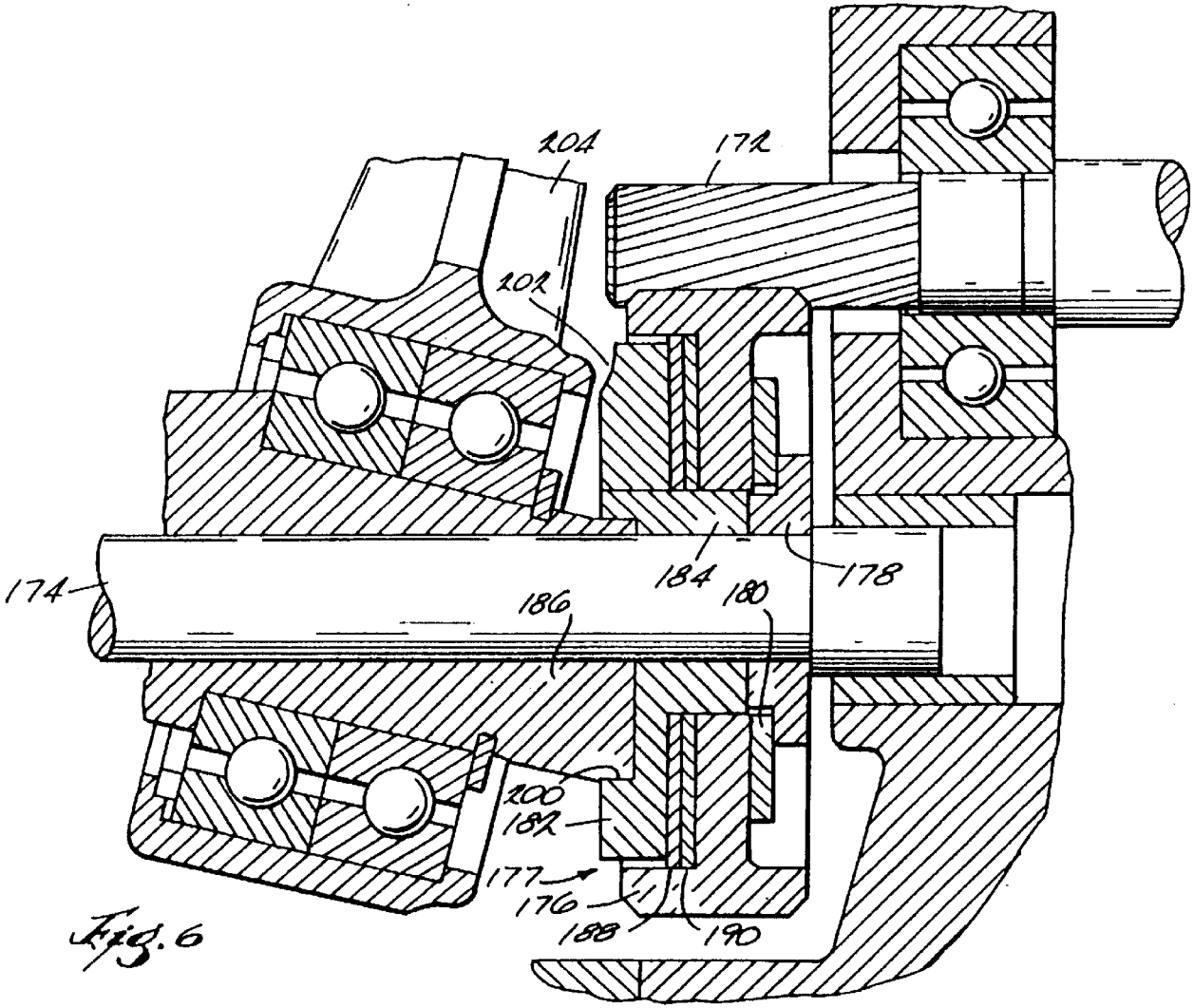
FIG. 6 is a side section view of the clutch mechanism of FIG. 6.

FIGS. 5–6 illustrate a third embodiment of the present invention. Similar to the above-described embodiments, the mechanism 170 of FIGS. 5–6 provides relative slippage between the drive pinion 172 (FIG. 6 only) and the jackshaft 174 (FIG. 6 only) of a reciprocating saw. Also similar to the previous embodiments, the illustrated mechanism includes a driven gear 176 having a recess 177, a spring retainer 178, a disk spring 180, a clutch driver 182 having a hub portion 184, and a wobble shaft 186 (FIG. 6 only).

The interface between the driven gear 176 and the clutch driver 182 is provided by a first clutch disk 188 interconnected with the driven gear 176 and a second clutch disk 190 interconnected with the clutch driver 182. Both the first and second clutch disks 188,190 are positioned within the recess 177 in the gear 176. The first clutch disk 188 includes a plurality of radially-outwardly projecting splines 192 that cooperate with corresponding axially-extending grooves 194 on the inner surface of the driven gear 176. The second clutch disk 190 includes a plurality of radially-inwardly projecting splines 196 that cooperate with corresponding axially-extending grooves 198 on the hub portion 184 of the clutch driver 182. In the described embodiment, the first clutch disk 188 is made of bronze and the second clutch disk 190 is made of steel. By virtue of the provision of two clutch disks, the illustrated mechanism has three friction surfaces, as opposed to the single friction surface of the previous embodiments.

The clutch driver 182 of the third embodiment (FIGS. 5–6) eliminates the tab 59 of the first and second embodiments, and instead interconnects with the wobble shaft 186 through a contoured recess 200 in the clutch driver 182. The contoured recess 200 is shaped to match the end of the wobble shaft 186 so that rotation of the clutch driver 182 will result in rotation of the wobble shaft 186. The full surface contact between the clutch driver 182 and the wobble shaft 186 is believed to enhance the strength, fatigue resistance and impact resistance of the interconnection.

The clutch driver 182 further includes a relief ledge 202. The relief ledge provides extra clearance between the clutch driver 182 and the wobble plate 204 (FIG. 6 only), thereby facilitating closer spacing of the entire assembly.

One embodiment of the invention provides a hand held reciprocating saw including a motor, a driving shaft, a driven shaft, and a clutch in driven engagement between the driving shaft and the driven shaft, which clutch activates to provide slippage between the driving shaft and the driven shaft only at a torque higher than the stalling torque of the motor. For example, any of the clutch mechanisms disclosed above in connection with FIGS. 1–4 can be configured to slip only at a torque higher than the stalling torque of the motor. Thus, the motor stalls when the saw encounters an unexpected impediment to operation, preventing harm to the motor, and the impulse caused by the impediment is absorbed by the clutch.

While clutch mechanisms and other means providing slippage have been described in connection with a reciprocating drive mechanism that includes wobble plates, it should be understood that the clutch mechanisms and other means providing slippage can be used in reciprocating drive mechanisms that include other means for converting rotary motion into reciprocating motion. It should also be understood that the clutch mechanisms could be located at other locations in the saw; for example, a clutch mechanism can be located closer to the blade, or a clutch mechanism can be provided between slip motor shafts. The illustrated embodiment has been found to provide a more economical location for the clutch mechanism.

Modifications may be made to the preferred embodiment described and illustrated herein without departing from the spirit of the invention as expressed in the following claims.

We claim:

[1. A reciprocating saw comprising:

a housing;

a spindle mounted for reciprocating motion within said housing;

a gear rotatably mounted within said housing;

a wobble shaft rotatably mounted within said housing and having an end adjacent said gear;

a wobble plate rotatably mounted on said wobble shaft and connected to said spindle; and a clutch drivingly connecting said gear to said wobble shaft, said clutch including a clutch driver rotatably positioned within said housing adjacent said wobble shaft, said clutch driver including a recess in driving engagement with said end of said wobble shaft.]

[2. A saw as claimed in claim 1, further comprising an axle rotatably mounted within said housing, said clutch driver and said wobble shaft being positioned about said axle.]

[3. A saw as claimed in claim 2, wherein said clutch driver includes an orifice for receiving said axle, and wherein said recess substantially surrounds said axle.]

[4. A saw as claimed in claim 1, wherein said clutch driver and said wobble shaft are mounted for rotation about a rotational axis, and wherein said recess is asymmetrical with respect to said rotational axis.]

[5. A saw as claimed in claim 1, wherein said recess includes an inner contour, wherein said end includes an outer contour, and wherein said outer contour of said end substantially matches said inner contour of said recess.]

[6. A saw as claimed in claim 1, wherein said clutch further includes:

a first clutch disk connected with said gear and positioned between said gear and said wobble shaft; and a second clutch disk connected with said clutch driver and positioned between said gear and said first clutch disk.]

[7. A saw as claimed in claim 1, wherein said clutch driver includes a relief ledge for providing clearance between said clutch driver and said wobble plate.]

[8. A saw as claimed in claim 1, wherein said gear includes a recess extending into said gear, and wherein said clutch is at least partially positioned within said recess of said gear.]

[9. A reciprocating saw comprising:

a housing;

a spindle mounted for reciprocating motion within said housing;

a gear rotatably mounted within said housing; and a clutch operatively positioned between said gear and said spindle, said clutch including:

a clutch driver rotatably positioned within said housing operatively between said gear and said spindle;

a first clutch disk connected with said gear and positioned between said gear and said clutch driver; and a second clutch disk connected with said clutch driver and positioned between said gear and said first clutch disk.]

[10. A saw as claimed in claim 9, wherein said clutch driver includes a hub portion, and wherein said first and second clutch disks are mounted about said hub portion.]

[11. A saw as claimed in claim 10, wherein said gear is mounted about said hub portion.]

[12. A saw as claimed in claim 9, wherein said gear includes a plurality of grooves, and wherein said first disk includes a plurality of splines positioned within said grooves.]

[13. A saw as claimed in claim 9, wherein said clutch driver includes a plurality of grooves, and wherein said second clutch disk includes a plurality of splines positioned within said grooves.]

[14. A saw as claimed in claim 9, wherein said gear includes a recess, and wherein said first and second clutch disks are positioned within said recess.]

[15. A reciprocating saw comprising:

a housing;

a spindle mounted for reciprocating motion within said housing;

a gear rotatably mounted within said housing, wherein said gear includes a recess extending into said gear;

a wobble shaft rotatably mounted within said housing;

a wobble plate rotatably mounted on said wobble shaft and connected to said spindle; and a clutch drivingly connecting said gear to said wobble shaft, said clutch including a clutch driver rotatably positioned within said housing adjacent said wobble shaft, said clutch driver including a surface in facing relation to said wobble plate, said surface including a relief ledge for providing clearance between said clutch driver and said wobble plate, wherein said clutch is at least partially positioned within said recess of said gear.]

[16. A saw as claimed in claim 15, wherein said clutch driver includes a recess housing a portion of said wobble shaft.]

[17. A reciprocating saw comprising:

a housing;

a spindle mounted for reciprocating motion within said housing;

a gear rotatably mounted within said housing, said gear including first and second opposed ends and a first recess extending into said first end and a second recess extending into said second end;

a drive mechanism for driving said gear;

a clutch drivingly connecting said gear to said spindle, said clutch being at least partially positioned within said first recess; and a biasing member at least partially positioned within said second recess.]

[18. A saw as claimed in claim 17, wherein said biasing member comprises a spring that biases said gear toward said clutch.]

*19. A reciprocating saw comprising:*

*a housing;*

*a spindle mounted for reciprocating motion within said housing;*

*a wobble shaft rotatably mounted within said housing for rotation about an axis and having a wobble shaft end for receiving power input;*

*a wobble plate rotatably mounted on said wobble shaft and connected to said spindle;*

*a driver rotatably positioned within said housing adjacent said wobble shaft for transferring power to said wobble shaft, said driver including a driver end engaging said wobble shaft end at an interface, wherein said interface includes a recess in one of said driver end and said wobble shaft end, said recess substantially surrounding said axis, a substantial portion of said recess being in driving engagement with the other of said driver end and said wobble shaft end;*

*wherein said recess defines a circumference, and wherein said portion of said recess in driving engagement with the other of said driver end and said wobble shaft end extends around more than half of said circumference.*

*20. A reciprocating saw comprising:*

*a housing;*

*a spindle mounted for reciprocating motion within said housing;*

*a wobble shaft rotatably mounted within said housing for rotation about an axis and having a wobble shaft end for receiving power input;*

*a wobble plate rotatably mounted on said wobble shaft and connected to said spindle;*

*a driver rotatably positioned within said housing adjacent said wobble shaft for transferring power to said wobble shaft, said driver including a driver end engaging said wobble shaft end at an interface, wherein said interface includes a recess in one of said driver end and said wobble shaft end, said recess substantially surrounding said axis, a substantial portion of said recess being in driving engagement with the other of said driver end and said wobble shaft end;*

*wherein said recess defines a circumference, wherein said portion of said recess in driving engagement with other of said driver end and said wobble shaft end extends around at least half of said circumference.*

*21. A saw as claimed in claim 20, wherein said portion of said recess in driving engagement with the other of said driver end and said wobble shaft end extends around at least three-quarters of said circumference.*

* * * * *

UNITED STATES PATENT AND TRADEMARK OFFICE

CERTIFICATE OF CORRECTION

PATENT NO. : RE 37,529 E
DATED : January 29, 2002
INVENTOR(S) : Bednar

It is certified that error appears in the above-identified patent and that said Letters Patent is hereby corrected as shown below:

Column 1,
Line 3, insert:

-- Notice: More than one reissue application has been filed for the reissue of patent 5,689,891. The reissue applications are application 09/967,564, a reissue of patent number 5,689,891 and a continuation of reissue application 09/500,252, filed 2/8/00, now reissue patent RE 37,529, which is a continuation of reissue application 09/164,985, filed 10/01/98, now reissue patent RE 37,211. --

Signed and Sealed this

Third Day of June, 2003

JAMES E. ROGAN
*Director of the United States Patent and Trademark Office*